United States Patent

Murayama et al.

[11] Patent Number: 5,702,821
[45] Date of Patent: Dec. 30, 1997

[54] MAGNETIC RECORDING MEDIUM COMPRISING FERROMAGNETIC POWDER AND A SPECIFIED POLYURETHANE RESIN

[75] Inventors: Yuichiro Murayama; Masaki Satake; Hiroshi Hashimoto; Tsutomu Okita, all of Odawara, Japan

[73] Assignee: Fuji Photo Film Co., Ltd., Kanagawa, Japan

[21] Appl. No.: 555,447

[22] Filed: Nov. 9, 1995

[30] Foreign Application Priority Data

Feb. 24, 1995 [JP] Japan ................ 7-037009
Aug. 30, 1995 [JP] Japan ................ 7-222040

[51] Int. Cl.$^6$ ................ G11B 5/702
[52] U.S. Cl. ................ 428/425.9; 428/694 BU; 428/694 BL; 428/900
[58] Field of Search ................ 428/425.9, 694 BU, 428/694 BL, 900

[56] References Cited

U.S. PATENT DOCUMENTS 4,637,959  1/1987  Ninomiya et al. ............ 428/425.9
5,153,071  10/1992  Watanabe et al. ............ 428/425.9

*Primary Examiner*—Stevan A. Resan
*Attorney, Agent, or Firm*—Sughrue, Mion, Zinn, Macpeak & Seas, PLLC

[57] ABSTRACT

In a binder for a magnetic recording medium for forming a magnetic layer with ferromagnetic powder dispersed therein being arranged on a non-magnetic support member, whereby said binder consists of a polyurethane resin, which is a reaction product of diol and organic diisocyanate as principal materials, said polyurethane resin contains a short-chain diol having cyclic structure by 17 to 40 weight %, and said polyurethane resin contains a long-chain diol comprising 1.0 to 5.0 mmol/g of ether group to total urethane resin by 10 to 50 weight %. According to a binder for a magnetic recording medium and a magnetic recording medium using said binder of the present invention, good dispersion property, high running durability and preservation property can be obtained.

3 Claims, No Drawings

MAGNETIC RECORDING MEDIUM COMPRISING FERROMAGNETIC POWDER AND A SPECIFIED POLYURETHANE RESIN

BACKGROUND OF THE INVENTION

The present invention relates to a magnetic recording medium, in which a magnetic layer with ferromagnetic powder dispersed in a binder is arranged on a non-magnetic support member, and in particular to a magnetic recording medium having high electromagnetic conversion characteristics and high durability.

Magnetic recording medium is widely used as sound recording tape, video tape, floppy disk, etc. In the magnetic recording medium, a magnetic layer with ferromagnetic powder dispersed in a binder is laminated on a non-magnetic support member.

The magnetic recording medium must be at high level in electromagnetic conversion characteristics, running durability and running performance, etc. An audio tape for reproducing music recorded on it must have high ability to reproduce the original sound. Also, a video tape must have high electromagnetic conversion characteristics, such as excellent ability to reproduce the original image.

In addition to such high electromagnetic conversion characteristics, the magnetic recording medium must have good running durability as described above. To keep good running durability, an abrasive material and a lubricant are added in the magnetic layer.

However, to obtain good running durability by adding the abrasive material, it is necessary to increase the adding quantity to some extent, and this decreases filling ratio of the ferromagnetic powder. In case the abrasive material having large particle size is used to obtain good running durability, the abrasive material is very likely to protrude excessively on the surface of the magnetic layer. Therefore, the improvement of the running durability by the abrasive material often results in deterioration of the electromagnetic conversion characteristics.

In case the running durability is improved by adding the lubricant, the adding quantity must be increased. As a result, the binder becomes easily plasticized and the durability of the magnetic layer tends to decrease.

In the improvement of the durability and the electromagnetic conversion characteristics, the binder, serving as a principal component of the magnetic layer, naturally plays an important role. When vinyl chloride resin, cellulose resin, urethane resin, acrylic resin, etc. are used as in the past, wear resistance of the magnetic layer decreases, and running components in the magnetic tape are often contaminated.

To solve the problems, a method has been adopted to increase hardness of the magnetic layer using a hard binder.

For example, a magnetic recording medium using a binder, which consists of polyester-polyurethane resin and polycarbonate-polyurethane resin is disclosed in JP-A-6-96437, and a urethane containing 2 to 4 mmol/g of urethane group is described in the examples, while there is no definite description on the content of long-chain diol and on OH group. Similarly, a binder containing urethane-urea, which consists of urethane and urea by 1.8 to 3.0 mmol/g in total is disclosed in JP-B-6-19821, and the ratio of long-chain diol in polyurethane resin in the resin synthesis example is 61 weight %. As a result, urethane bond concentration is high and durability is good, but the electromagnetic conversion characteristics decreases due to the decrease of dispersion property caused by high viscosity of a coating solution.

The use of polyurethane resin using short-chain diol having cyclic structure has been proposed. In JP-A-61-48626, polyesterpolyol containing bisphenol A by 20% is used. In the examples, the urethane contains bisphenol A by 13 weight % and polyol by 69 weight %, while dispersion property is decreased because solubility in solvent is lower due to cyclic structure. In JP-A-1-251416, polyurethane contains bisphenol A in chain extender and polycarbonate-polyol as short-chain diol having cyclic structure. From the examples, it is known that the content of bisphenol A is 16 weight % and the content of polyol is 63 weight %, but there is the problem in that the dispersion property is decreased because solubility in solvent is lowered by the presence of cyclic structure. The use of lactone denatured polyol containing bisphenol S is disclosed in JP-B-7-21851. From the examples, it is known that it is a polyurethane containing polyol by 52 weight % and bisphenol S by 13 weight %, but the same problem as above occurs due to the presence of cyclic structure.

JP-A-1-267829 describes a polyurethane resin, which contains polyether-polyol having cyclic structure, and it is described that ethyleneoxide or propyleneoxide addition products of bisphenol A or hydrogenated bisphenol A are used as diol (molecular weight 250 to 3,000). From the examples, it is known that it contains polyol by 70 weight % and ether of 8 mmol/g or more. As a result, coating film is softened, and decrease of durability is noted such as contamination of head.

According to JP-A-61-190717, polytetramethyleneglycol and polycaprolactonepolyol are used as polyurethane resin. From the examples, it is known that it contains polyol by 70 weight % or more, and the same problem occurs such as softening of coating film or decrease of durability such as contamination of head.

JP-B-6-64726 describes a polyurethane resin, in which branched polyesterpolyol is reacted with isocyanate-terminal prepolymer. From the synthesis examples, it is known that it contains OH groups of $8.2 \times 10^{-5}$ eq/g. The content is high and viscosity of the solution increases, while dispersion property is decreased. Further, the strength of resin is decreased and repeated running property is deteriorated due to the presence of branched polyol.

Similarly, JP-A-3-44819 describes a magnetic recording medium, in which a binder comprising a compound having at least one OH group at both terminals and polyisocyanate. Description is given only on the use of polyester-polyol, and the problems remain such as lower strength of resin, deterioration of repeated running property, etc.

JP-A-62-82510 describes a binder containing polyurethane resin, which has three or more terminals in average in main chain and branched chain and primary hydroxyl groups at least at two terminals. From the examples, it is known that it contains polyester-polyol, but the strength of resin and repeated running durability are not sufficient.

As explained above, it is described that long-chain diol having hydrophilic segment such as polyester, polyether, polycarbonate, etc. is generally used in polyurethane resin or polyurethane-urea resin used as a binder for the magnetic recording medium. Also, it is described according to the examples in the prior art that the long-chain diol in the resin is contained by 25 mol % or more in all cases.

However, the polyurethane resin or the polyurethane-urea resin contains hydrophilic segment as described above, and this hinders affinity with organic solvents. Hydrophilic polar group is likely to cause aggregation, and the extent of molecular chain tends to decrease in the organic solvent, and this impairs dispersion property of the ferromagnetic powder.

The long-chain diol having hydrophilic segment is disadvantageous in that, in case of polyester, ester linking group is easily hydrolyzed and preservation property is decreased. In case of polyether, it has low glass transition temperature and is soft and low in strength such as polytetramethyleneetherglycol, polypropyleneglycol, polyethyleneglycol, etc.

It is an object of the present invention to provide a binder for a magnetic recording medium, which has very high dispersion property, good long-term preservation property, high coating film strength under high temperature condition, and excellent electromagnetic conversion characteristics and running durability.

SUMMARY OF THE INVENTION

To attain the above object, the binder of a magnetic recording medium for forming a magnetic layer with ferromagnetic powder dispersed in the binder and arranged on a non-magnetic support member, whereby said binder consists of a polyurethane resin, which is a reaction product with diol and organic diisocyanate as principal raw materials, the polyurethane resin contains a short-chain diol having cyclic structure by 17 to 40 weight %, and the polyurethane resin contains a long-chain diol by 10 to 50 weight %, which contains an ether group of 1.0 to 5.0 mmol/g to total quantity of the polyurethane resin.

The invention also provides a binder for a magnetic recording medium as described above, wherein molecular weight of the short-chain diol having cyclic structure is less than 500 and molecular weight of the long-chain diol having said ether group is 500 to 5,000.

The invention also provides a binder for a magnetic recording medium as described above, wherein the polyurethane resin contains 3 to 20 OH groups per molecule.

The invention also provides a binder for a magnetic recording medium as described above, wherein the polyurethane resin has in its molecule at least one type of polar groups selected from —SO$_3$M, —OSO$_3$M, —COOM, —PO$_3$M'$_2$, —OPO$_3$M'$_2$, —NR$_2$, —N$^+$R$_2$R'COO— (where M represents a hydrogen atom, an alkali metal, an alkali earth metal or an ammonium salt, M' represents a hydrogen atom, an alkali metal, an alkali earth metal or an ammonium salt, and R and R' each represents an alkyl group having 1 to 12 carbon atoms).

The invention also provides a magnetic recording medium, in which ferromagnetic powder is dispersed in a binder for magnetic recording medium according to claim 1 and a magnetic layer formed by coating a coating solution is arranged on a non-magnetic support member, and said magnetic layer is less than 1 μm in thickness.

DESCRIPTION OF THE PREFERRED EMBODIMENTS

The short-chain diol having cyclic structure used as raw material for polyurethane resin contained in the binder for the magnetic recording medium of the present invention is preferably a diol containing an aromatic or alicyclic compound such as hisphenol A, hydrogenated hisphenol A given by the following formula 1, hisphenol S, hisphenol P and ethyleneoxide or propyleneoxide addition product of these compounds, cyclohexanedimethanol, cyclohexanediol, etc.

Formula 1

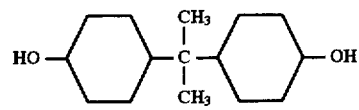

More preferably, it is hydrogenated bisphenol A given by the formula 1 and its ethyleneoxide or propyleneoxide addition product.

It is preferable that polyurethane resin contains the short-chain diol by 17 to 40 weight %, or more preferably by 20 to 30 weight %. If it is contained by less than 17 weight %, the film obtained is too soft and sufficient strength cannot be obtained, and still durability is decreased. If it is more than 40 weight %, solubility in solvent decreases and dispersion property of ferromagnetic powder is likely to decrease. As a result, electro-magnetic conversion characteristics tends to be lower and the strength of the magnetic layer is weakened.

The short-chain diol having cyclic structure has preferably molecular weight of 50 to 500, or more preferably 100 to 300. If it is less than 50, the magnetic layer becomes fragile and durability decreases. If it is more than 500, glass transition temperature (Tg) of the magnetic layer decreases, and it is softened and durability is reduced.

Polyurethane resin contains ether group preferably by 1.0 to 5.0 mmol/g, or more preferably 2.0 to 4.0 mmol/g. If it is contained by less than 1 mmol/g, adsorption property to the magnetic member is decreased, and dispersion property is also lowered. On the other hand, if it is contained by more than 5.0 mmol/g, solubility in solvent is lowered and dispersion property is worsened.

It is preferable that polyurethane resin contains 3 to 20 OH groups per molecule, or more preferably 4 to 5 OH groups per molecule. If it is less than 3 groups per molecule, the reactivity with isocyanate curing agent decreases. As a result, the strength of the coating film is weakened, leading to poor durability. If it contains more than 20 OH groups, solubility in solvent decreases, resulting in poor dispersion property.

It is preferable that the long-chain diol containing ether group used as principal raw material for the polyurethane resin is contained by 10 to 50 weight %, or more preferably by 30 to 40 weight %. If it is contained by less than 10 weight %, solubility in solvent decreases, resulting in poor dispersion property. If it is contained by more than 50 weight %, the strength of the coating film is weakened, and durability decreases.

The long-chain diol is preferably hisphenol A, hydrogenated hisphenol A, hisphenol S, hisphenol P and polyethyleneoxide or propyleneoxide addition product of these compounds, polypropyleneglycol, polyethyleneglycol, or polytetramethyleneglycol. More preferably, it is hydrogenated bisphenol A and ethyleneoxide or propyleneoxide addition product of these compounds, and a compound expressed by the following formula 2:

Formula 2

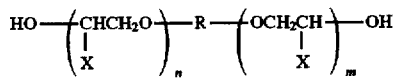

where R represents at least one of:

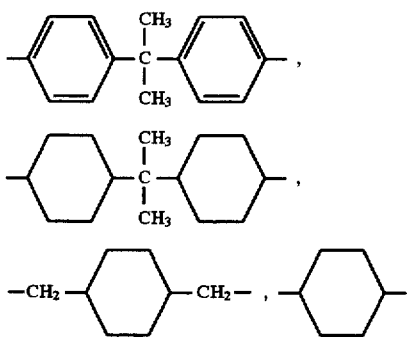

In the above, the value of n or m is 3 to 24 respectively, or more preferably 3 to 20, or most preferably 4 to 15. If n or m is smaller than 3, urethane bond concentration becomes too high, leading to lower solubility in solvent or to fragile coating film. Further, dispersion property and durability are decreased. If it is more than 24, still durability is decreased.

In the long-chain diol, R is preferably one of (1) or (2) below:

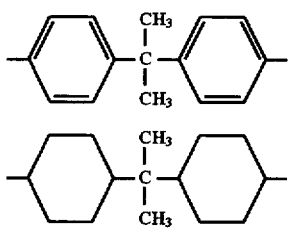

or more preferably R represents (1).

In the present invention, polyurethane resin has a cyclic structure. Thus, the strength of coating film is high and durability is good. Because branched $CH_3$ is present in propylene, solubility in solvent in high, and dispersion property is good.

In the long-chain diol of the formula 2, X preferably represents a hydrogen atom or a methyl group, or more preferably a methyl group.

Weight average molecular weight (Mw) of the long-chain diol is preferably 500 to 5,000. If it is more than 5,000, the strength of the coating film is weak and the film becomes soft, thus leading to poor durability.

Number average molecular weight (Mn) of polyurethane resin of the present invention is preferably 5,000 to 100,000, or more preferably 10,000 to 50,000. In particular, it is preferably 20,000 to 40,000. If it is less than 5,000, the strength of the magnetic layer is decreased, leading to poor durability. If it is more than 100,000, solubility in solvent decreases, leading to poor dispersion property.

Glass transition temperature Tg of the polyurethane resin of the present invention is 50° to 200° C., more preferably 80° to 150° C., or most preferably 100° to 130° C. If it is less than 50° C., the strength of the magnetic layer at high temperature decreases, and this results in poor durability and low preservation property. If it is higher than 200° C., calender formability decreases, resulting in lower electromagnetic conversion characteristics.

As the compound for adjusting the content of OH groups in polyurethane resin, a compound having 3 functional OH groups or more may be used. More concretely, trimethylolethane, trimethylolpropane, trimellitic acid anhydride, glycerine, pentaerythritol, hexanetriol, etc. may be used. Dibasic acid used as raw material for polyester-polyol as described in JP-B-6-64726 explained as the prior art and branched polyester, polyetherester having 3 or more functional OH groups obtained using the above compounds as glycol component may be used. It is preferable to use a compound with 3 functional groups. The compound having 4 or more functional groups is more likely to be turned to gel in reaction process.

As the binder comprising the polyurethane resin according to the present invention, it is preferable to use a compound having in its molecule at least one type of polar groups selected from $—SO_3M$, $—OSO_3M$, $—COOM$, $—PO_3M'_2$, $—OPO_3M'_2$, $—NR_2$, $—N^+R_2R'COO—$ (where M represents a hydrogen atom, an alkali metal, an alkali earth metal or an ammonium salt, M' represents a hydrogen atom, an alkali metal, an alkali earth metal or an ammonium salt, and R and R' each represents an alkyl group). More preferably, a compound having $—OS_3M$ or $—OSO_3M$ may be used. The quantity of these polar groups is preferably $1 \times 10^{-5}$ to $2 \times 10^{-4}$ eq/g, or more preferably $5 \times 10^{-5}$ to $1 \times 10^{-4}$ eq/g. If it is less than $1 \times 10^{-5}$ eq/g, adsorption to ferromagnetic powder is insufficient and dispersion property is decreased. If it is more than $2 \times 10^{-4}$ eq/g, solubility in solvent is decreased, leading to poor dispersion property.

In case the binder of the present invention is used in the magnetic layer, vinyl chloride type synthetic resin may be simultaneously used in polyurethane resin. The degree of polymerization of vinyl chloride resin suitable for simultaneous use is preferably 200 to 600, or more preferably 250 to 450. The vinyl chloride type resin may be the one copolymerized with vinyl type monomer such as vinyl acetate, vinyl alcohol, vinylidene chloride, acrylonitrile, etc. Or, cellulose derivative such as nitrocellulose resin, or acrylic resin, polyvinylacetal resin, polyvinylbutyral resin, epoxy resin, phenoxy resin, etc. may be simultaneously used. These can be used alone or in combination.

In case the other synthetic resin is simultaneously used, the polyurethane resin in the magnetic layer is contained preferably by 10 to 100 weight %, or more preferably by 20 to 100 weight %, or most preferably by 50 to 100 weight %. If it is contained by less than 10 weight %, solubility in solvent decreases, leading to poor dispersion property.

The binder preferably contains vinyl chloride resin by 10 to 80 weight %, or more preferably by 20 to 70 weight %, or most preferably by 30 to 60 weight %.

As the short-chain diol having cyclic structure of the present invention, the other diol may be simultaneously used. More concretely, aliphatic diol or alicyclic diol such as ethyleneglycol, 1,3-propylenediol, 1,2-propyleneglycol, 1,4-butanediol, 1,5-pentanediol, 1,6-hexanediol, 2,2-dimethylpropanediol, 1,8-octanediol, 1,9-nonanediol, diethyleneglycol, cyclohexane-1,4-diol, cyclohexane-1,4-dimethanol, etc., or aromatic diol such as bisphenol A, ethyleneoxide or propyleneoxide addition product of hisphenol A, or ethyleneoxide or propyleneoxide addition product of N-diethanolamine may be used.

Among these compounds, it is preferable to use ethyleneoxide addition product or propyleneoxide addition product of hisphenol A or hydrogenated bisphenol A, or more preferably propyleneoxide addition product of bisphenol A.

By using these compounds, it is possible to obtain coating film having high strength and high Tg due to the presence of cyclic structure and high durability. By introducing branched $CH_3$, solubility in solvent can be increased, thus resulting in high dispersion property.

In the binder of the present invention, organic diisocyanate may be contained. As the organic diisocyanate compound, aromatic diisocyanate such as 2,4-tolylenediisocyanate, 2,6-tolylenediisocyanate, xylene-1,4- diisocyanate, xylene-1,3-diisocyanate, 4-4'-diphenylmethanediisocyanate, 4,4-diphenyletherdiisocyanate, 2-nitrodiphenyl-4,4-diisocyanate, 2,2'-diphenylpropane-4,4'-diisocyanate, 4,4'-diphenylpropanediisocyanate, m-phenylenediisocyanate, p-phenylenediisocyanate, naphthylene-1,4-diisocyanate, naphthylene-1,5-diisocyanate, 3,3'-dimethoxydiphenyl-4,4'-diisocyanate, aliphatic diisocyanate such as lysinediisocyanate, or alicyclic diisocyanate such as isophoronediisocyanate, hydrogenated tolylenediisocyanate, hydrogenated diphenylmethanediisocyanate, etc. may be used.

The polyisocyanate compound in the magnetic layer is contained in the binder preferably by 10 to 50 weight %, or more preferably by 20 to 40 weight %.

When curing by electron beam irradiation is performed, a compound having reactive double bond such as urethane acrylate may be used.

The total weight of a combination of resin components and curing agent (i.e. total weight of the binder) is preferably within the range of 15 to 40 weight parts to 100 weight parts of the ferromagnetic powder, or more preferably within 20 to 30 weight parts.

As the ferromagnetic powder used in the magnetic recording medium of the present invention, ferromagnetic iron oxide, ferromagnetic iron oxide containing cobalt or ferromagnetic alloy powder preferably having specific surface area ($S_{BET}$) of 40 to 80 $m^2/g$, or more preferably 50 to 70 $m^2/g$ may be used. Crystallite size is 12 to 25 nm, or more preferably 13 to 22 nm, or most preferably 14 to 20 nm. Major axis length is 0.05 to 0.25 μm, or more preferably 0.07 to 0.2 μm, or most preferably 0.08 to 0.15 μm. As the ferromagnetic metal powder, Fe, Ni, Fe-Co, Fe-Ni, Co-Ni, Co-Ni-Fe, etc. may be used, and the following metal components may be contained by less than 20 weight %: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, etc. Or, the ferromagnetic metal powder may contain a small quantity of water, hydroxide or oxide. The method for manufacturing the ferromagnetic powder is already known, and the ferromagnetic powder used in the present invention can be manufactured by the method already known.

There is no special restriction on the shape of the ferromagnetic powder. Usually, the powder in shape of needle, granule, cube, grain or plane may be used. It is preferable to use ferromagnetic powder of needle shape.

The above resin components, curing agent and ferromagnetic powder are mixed with and dispersed in a solvent such as methylethylketone, dioxane, cyclohexanone, ethyl acetate, etc. normally used for the preparation of a magnetic coating material, and this is used as a magnetic coating material. Mixing and dispersion can be carried out by a commonly known method.

In addition to the above components, the magnetic coating material may contain abrasive materials such as α-$Al_2O_3$, $Cr_2O_3$, etc., antistatic agent such as carbon black, lubricant or dispersion agent such as fatty acid, fatty acid ester, silicone oil, etc. or additives or filling agents generally used.

Next, description will be given on a lower non-magnetic layer or a lower magnetic layer in case of multiple-layer medium according to the present invention. Inorganic powder used in the lower layer in the present invention may be magnetic powder or non-magnetic powder. For example, in case of non-magnetic powder, it may be selected from inorganic compounds such as metal oxide, metal carbonate, metal sulfate, metal nitride, metal carbide, metal sulfide, etc. As the inorganic compounds, α-alumina having α-ratio of 90 to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. may be used alone or in combination. It is preferable to use titanium dioxide, zinc oxide, iron oxide, and barium sulfate, or more preferably titanium dioxide. Average particle size of the non-magnetic powder is preferably 0.005 to 2 μm, while non-magnetic powder having different average particle size may be combined as necessary, or a single type of non-magnetic powder with wider distribution of particle size may be used to obtain the same effect. Above all, it is preferable to use non-magnetic powder with average particle size of 0.01 to 0.2 μm. The non-magnetic particle has preferably pH value between 6 and 9. Specific surface area of the non-magnetic powder is preferably 1 to 100 $m^2/g$, or more preferably 5 to 50 $m^2/g$, or most preferably 7 to 40 $m^2/g$. Crystallite size of the non-magnetic powder is preferably 0.01 to 2 μm. Oil absorption using DBP is 5 to 100 ml/100 g, or more preferably 10 to 80 ml/100 g, or most preferably 20 to 60 ml/100 g. Specific gravity is 1 to 12, or more preferably 3 to 6. The shape may be in any shape including needle, sphere, polyhedron, or plane.

It is preferable to perform surface treatment for the surface of the non-magnetic powder with $Al_2O_3$, $SiO_2$, $TiO_2$, $ZrO_2$, $SnO_2$, $Sb_2O_3$, or ZnO. For the dispersion property, it is preferable to use $Al_2O_3$, $SiO_2$, $TiO_2$, or $ZrO_2$, or more preferably $Al_2O_3$, $SiO_2$, or $ZrO_2$. These may be used in combination or alone. Depending upon individual purpose, coprecipitated surface treatment layer may be used, or the method to treat the surface with silica after treating with alumina, or the method reversing this may be adopted. The surface treatment layer may be porous depending upon the purpose, while it is generally preferable that it is homogeneous and dense.

The effect Rs as already known may be decreased and micro-Vickers hardness as desired can be obtained by mixing carbon black in the lower layer. For this purpose, furnace black for rubber, thermal black for rubber, carbon black for color, acetylene black, etc. may be used.

Specific surface area of carbon black is 100 to 500 $m^2/g$, or more preferably 150 to 400 $m^2/g$. DBP oil absorption is 20 to 400 ml/100 g, or more preferably 30 to 200 ml/100 g. Average particle size of carbon black is 5 to 80 nm, or more preferably 10 to 50 nm, or most preferably 10 to 40 nm. It is preferable that pH value of carbon black is 2 to 10, moisture content is 0.1 to 10%, and that tap density is 0.1 to 1 g/ml. Concrete examples of carbon black used in the present invention are: Black Pearls 2000, 1300, 1000, 900, 800, 880, or 700 (Cabot), Vulcan XC-72 (Mitsubishi Chemical), #3050B, #3150B, #3250B, #3750B, #3950B, #950, #650B, #970B, #850B, MA-600 (Columbia Carbon), Conductex SC, Raven 8800, 8000, 7000, 5750, 5250, 3500, 2100, 2000, 1800, 1500, 1255, 1250, or Ketchen Black EC (Akzo), etc.

For the lower layer in the magnetic recording medium of the present invention, magnetic powder may be used. As the magnetic powder, alloy having γ-$Fe_2O_3$, Co modified γ-$Fe_2O_3$, α-Fe, or $CrO_2$, etc. may be used. In particular, it is preferable to use Co modified γ-$Fe_2O_3$. The ferromagnetic powder used in the lower layer has preferably the same composition and performance as the ferromagnetic powder used in the upper magnetic layer. However, the performance should be varied in the upper and the lower layers according to the purpose. For example, to improve long wavelength recording characteristics, it is desirable to set Hc of the lower magnetic layer to lower than that of the upper magnetic layer, and it is effective to set Br in the lower magnetic layer to a value higher than that of the upper magnetic layer. Further, advantage may be added by adopting multiple-layer arrangement as already known.

For the binder, lubricant, dispersion agent, additive, solvent, and dispersion procedure, etc. of the lower magnetic layer or the lower non-magnetic layer, those of the magnetic layer may be applied. In particular, for quantity and type of the binder and for adding quantity and type of additive or dispersion agent, the technique used for the magnetic layer can be applied.

The magnetic coating material prepared from the above materials is coated on a non-magnetic support member to form a magnetic layer.

As the non-magnetic support member used in the present invention, polyethylenenaphthalate, polyethyleneterephthalate, polyamide, polyimide, polyamideimide, aromatic polyamide, polybenzoxydazol, etc. after biaxial stretching may be used. It is more preferable to use polyethylenenaphthalate or aromatic polyamide. The non-magnetic support members may be treated in advance by corona discharge, plasma processing, processing for adhesion, heat treatment, etc. The non-magnetic support member used in the present invention preferably has the surface with highly smooth surface, i.e. average surface roughness at central line of 0.1 to 20 nm at cutoff value of 0.25 mm, or more preferably within the range of 1 to 10 nm. It is also preferable that the non-magnetic support member has not only low average surface roughness at central line but also no sign of coarse projection of more than 1 µm.

To manufacture the magnetic recording medium of the present invention, the coating solution for the magnetic layer is coated on the surface of the non-magnetic support member under running condition in such manner that the layer thickness of the magnetic layer after drying is to be within the range of 0.05 to 5 µm, or more preferably 0.07 to 1 µm. A plurality of magnetic coating materials may be coated in multiple layers sequentially or at the same time.

As the coating machines for coating the above magnetic coating materials, any machine including air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. may be used.

For these coating procedures, "The Newest Coating Technique" published by the General Technical Center, Ltd. (May 31, 1983) may be referred.

In case the present invention is applied to a magnetic recording medium having two layers or more, the following are proposed as examples of the coating machines and procedures:

(1) Using coating machines such as gravure, roll, blade, extrusion, etc. generally applied for the coating of magnetic coating materials, the lower layer is coated at first, and while the lower layer is not dried yet, the upper layer is coated using a support member pressure type extrusion coating machine as disclosed in JP-B-1-46186, JP-A-60-238179, JP-A-2-265672, etc.

(2) The upper and the lower layers are coated almost at the same time by a coating head, which has two slits for the coating solution as disclosed in JP-A-63-88080, JP-A-2-17971, or JP-A-2-265672.

(3) The upper and the lower layers are coated almost at the same time by an extrusion coating machine with backup roll as disclosed in JP-A-2-174965.

In the non-magnetic support member used in the present invention, a back-coat layer (backing layer) may be provided on a side of the support member with no magnetic coating material coated on it. On the back-coat layer, a coating material for forming the back-coating layer, which is obtained by dispersing granular components such as abrasive, antistatic agent, etc. and the binder in an organic solvent, is coated on the side of the non-magnetic support member where the magnetic coating material is not coated. As the granular components, various types of inorganic pigment or carbon black may be used. As the binder, resins such as nitrocellulose, phenoxy resin, vinyl chloride resin, polyurethane resin, etc. may be used alone or by mixing together.

A layer with adhesive agent may be provided on coating surface where the magnetic coating material or the coating material for forming back-coat layer for the non-magnetic support member are coated.

The coating layer of the magnetic coating material coated on it is dried after the ferromagnetic powder in the coating layer of the magnetic coating material has been processed by magnetic field orientation.

After drying as described above, surface smoothening is performed on the coating layer. For the surface smoothening, super-calender roll is used, for example. By the surface smoothening, pores generated by removal of solvent during drying are eliminated, and filling ratio of the ferromagnetic powder in the magnetic layer increases, and a magnetic recording medium having high electromagnetic conversion characteristics can be obtained.

As the calender processing roll, heat-resistant plastic rolls made of epoxy, polyimide, polyamide, polyamideimide, etc. are used. Also, it is possible to process using metal rolls.

The magnetic recording medium of the present invention preferably has very high surface smoothness with the central line average surface roughness at 0.01 to 4 nm with cutoff value of 0.25 mm, or more preferably 1 to 3 nm. To obtain such smoothness, the above calender processing is performed on the magnetic layer, which has been formed by selecting a specific type of ferromagnetic powder and the binder as described above. The conditions for the calender processing are: calender roll temperature at 60° to 100° C., or more preferably 70° to 100° C., or most preferably 80° to 100° C.; pressure at 100 to 500 kg/cm, or more preferably 200 to 45 kg/cm, or most preferably 300 to 400 kg/cm.

The magnetic recording medium thus obtained can be cut to adequate size using a cutter and is used.

Polyurethane resin used for the binder of the magnetic recording medium of the present invention contains high percentage of the short-chain diol having cyclic structure such as aromatic or alicyclic compounds, and high strength and high glass transition temperature can be attained compared with conventional type polyurethane resin. In particular, it has excellent performance in repeated running under high temperature condition. Because of the high content of the short-chain diol, urethane bond concentration in polyurethane resin is substantially increased, and high strength and high glass transition temperature can be attained.

In the conventional type polyurethane resin, due to the presence of cyclic structure or to the increase of urethane bond concentration, solubility in solvent is decreased, resulting in poor dispersion property, while, in the polyurethane of the present invention, the solubility in solvent is also high.

This is because the polyurethane resin of the present invention contains very small quantity of hydrophilic ether group and polyurethane is more easily adsorbed to the magnetic substance without decreasing solubility in solvent, thus resulting in high dispersion property.

Also, the magnetic layer does not become fragile because adequate stretching property can be added, and repeated running performance is also not decreased.

Further, due to the presence of cyclic structure in the short-chain diol, steric hindrance property is added near urethane bond. This makes it more difficult for urethane bonds to associate themselves in the molecule. Thus, even when urethane bond concentration is high, solubility is not decreased.

In case OH groups branched at molecular terminals are contained more, mobility is higher and adsorbability to the magnetic substance is also higher than OH group at other than terminals, and dispersion property is further increased. Also, reactivity with isocyanate type curing agent commonly used is also improved, and this contributes to high durability.

In the following, detailed description will be given on embodiments of the present invention.

The word "part(s)" as mentioned below means "weight part(s)", and % means weight %.

(SYNTHESIS EXAMPLE 1)

(Synthesis Example of Polyurethane Resin A)

In a container equipped with reflux condenser and stirrer and with the content substituted in advance with nitrogen, monomer as shown in Table 1 and dimethylester sulfoisophthalate (Taoka Chemical; DEIS) were dissolved in a mixing solvent, containing cyclohexanone and dimethylacetoamide at weight ratio of 50:50 under nitrogen stream at 60° C. As catalyst, di-n-dibutyl-tin-dilaurate may be added by 60 ppm to total quantity of the raw material.

Next, diisocyanate compound as shown in Table 1 was added, and this was heated at 90° C. for 6 hours, and polyurethane resins A to T were obtained. Composition and quantity of diol and contents of ether group and polyol are shown in Table 1. Weight average molecular weight of the polyurethane resin thus obtained was 40,000 to 50,000, and number average molecular weight was 23,000 to 28,000.

TABLE 1

| Polyurethane | Type and composition of diol (mol ratio) | | | | | | Diisocyanate (mol ratio) | |
|---|---|---|---|---|---|---|---|---|
| | Diol of Formula 1 | | Diol of Formula 2 | PCL400 | PPG400 | DEIS | | |
| A | HDpA | 24 | BpA-pp0700 | 4 | 0 | 20 | 2 | MDI | 50 |
| B | ↓ | 23 | ↓ | 4 | 19 | 2 | 2 | ↓ | ↓ |
| C | ↓ | 26 | ↓ | 9 | 0 | 14 | 2 | ↓ | ↓ |
| D | ↓ | 26 | ↓ | 9 | 14 | 0 | 2 | ↓ | ↓ |
| E | ↓ | 39 | ↓ | 3 | 0 | 6 | 1 | TDI | ↓ |
| F | ↓ | 39 | ↓ | 3 | 3 | 3 | 1 | ↓ | ↓ |
| G | ↓ | 40 | ↓ | 4 | 7 | 0 | 1 | ↓ | ↓ |
| H | ↓ | 40 | ↓ | 7 | 1 | 0 | 1 | ↓ | ↓ |
| I | ↓ | 23 | HBpA-PP0700 | 4 | 19 | 2 | 2 | MDI | ↓ |
| J | ↓ | 25 | CHMPP0600 | 5 | 17 | 2 | 2 | ↓ | ↓ |
| K | ↓ | 25 | CDPP0600 | 5 | 17 | 2 | 2 | ↓ | ↓ |
| L | ↓ | 19 | BpA-000700 | 4 | 0 | 25 | 2 | ↓ | ↓ |
| M | ↓ | 19 | ↓ | 4 | 19 | 6 | 2 | ↓ | ↓ |
| N | ↓ | 43 | ↓ | 3 | 0 | 3 | 1 | TDI | ↓ |
| O | ↓ | 43 | ↓ | 3 | 3 | 0 | 1 | ↓ | ↓ |
| P | ↓ | 24 | ↓ | 2 | 2 | 20 | 2 | MDI | ↓ |
| Q | ↓ | 24 | ↓ | 2 | 21 | 1 | 2 | ↓ | ↓ |
| R | ↓ | 25 | ↓ | 4 | 19 | 0 | 2 | ↓ | ↓ |
| S | ↓ | 26 | BpA-PP03000 | 1 | 17 | 5 | 2 | ↓ | ↓ |
| T | ↓ | 26 | BpA-PP03500 | 1 | 17 | 5 | 2 | ↓ | ↓ |

The diols shown in the table are as follows:

HBpA: Hydrogenated bisphenol A
(Shin-Nippon Rika: Rikabinol HB)

BpA-PP0700: Polypropyleneoxide addition product of bisphenol A
(molecular weight: 700)

BpA-PP03000: Polypropyleneoxide addition product of bisphenol A
(molecular weight: 3000)

BpA-PP03500: Polypropyleneoxide addition product of bisphenol A
(molecular weight: 3500)

HBpA-PP0700: Polypropyleneoxide addition product of hydrogenated hisphenol A
(molecular weight: 700)

CHM-PP0600: Polypropyleneoxide addition product of cyclohexanedimethanol
(molecular weight: 600.)

CD-PP0600: Polypropyleneoxide addition product of cyclohexanediol
(molecular weight: 600)

PCL400: Polycaprolactonepolyol
(molecular weight: 400)

PPG400: Polypropyleneglycol
(molecular weight: 400)

(EXAMPLE 1)

Using an open kneader, 100 parts of ferromagnetic alloy powder (composition: Fe 92%, Zn 4%, Ni 4%, Hc: 2470oe; crystallite size 15 nm, BET specific surface area 59 $m^2$/g; major axis diameter 0.12 μm; needle ratio 7; υs 140 emu/g) were pulverized for 10 minutes. Next, 2.5 parts of a compound obtained by adding hydroxyethylsulfonate sodium salt to a copolymer of vinyl chloride/vinyl acetate/glycidylmethacrylate (86/9/5) ($SO_3Na=6\times10^{-5}$ eq/g; epoxy=$10^{-3}$ eq/g; Mw 30,000), 10 parts of polyurethane resin (solids), and 60 parts of cyclohexanone were kneaded for 60 minutes. Then, the following compounds were added:

| | |
|---|---|
| Abrasive (Al$_2$O$_3$; particle size 0.3 μm) | 2 parts |
| Carbon black (particle size 40 nm) | 2 parts |
| Methylethylketone/toluene (1/1) | 200 parts | and the mixture was dispersed for 120 minutes using a sand mill. To this, the following compounds were added:

| | |
|---|---|
| Polyisocyanate (Nippon Polyurethane; Coronate 3041) | 5 parts (solids) |
| Butyl stearate | 2 parts |
| Stearic acid | 1 part |
| Methylethylketone | 50 parts | and this was further mixed and stirred for 20 minutes. Then, this was filtered through a filter having average pore size of 1 μm, and a magnetic coating material was prepared. The magnetic coating material thus prepared was coated using a reverse roll on the surface of a poly-ethylenenaphthalate of 10 μm in thickness in such manner that the thickness after drying was to be 2.5 μm. The non-magnetic support member with the magnetic coating material coated on it was processed by magnetic field orientation using a magnet of 3000 gauss while the magnetic coating material was not yet dried. Further, calender processing was performed after drying using a combination of metal roll—metal roll—metal roll—metalroll—metal roll—metal roll—metal roll at a rate of 100 m/min., linear pressure of 300 kg/cm, and temperature of 90° C., and the product was slit to pieces each 8 mm in width. (Examples 2 to 12 and Comparative Examples 1 to 7)

Examples 2 to 12 and Comparative Examples 1 to 7 were prepared by the same procedure as in Example 1 except that the polyurethane resin A was changed to polyurethane resins shown in Table 2.

(EXAMPLE 13)

Preparation of Magnetic Solution for the Upper Layer

Magnetic coating solution of Example 1 was used.

Preparation of Non-Magnetic Solution for the Lower Layer

Using an open kneader, 85 parts of titatium oxide (average particle size 0.035 μm; crystal type futile; TiO$_2$ content 90% or more; surface-treated layer: alumina; S$_{BET}$ 35 to 42 m$^2$/g, true specific gravity 4.1; pH 6.5 to 8.0) were pulverized for 10 minutes. Then, 11 parts of a compound (SO$_3$Na=6×10$^{-5}$ eq/g; epoxy=10$^{-3}$ eq/g; Mw 30,000) obtained by adding hydroxyethylsulfonate sodium salt to a copolymer of vinyl chloride/vinyl acetate/glycidyl-methacrylate (86/9/5), 10 parts of sulfonic acid containing polyurethane resin (solids), and 60 parts of cyclohexanone were mixed and kneaded for 60 minutes. Then,

| | |
|---|---|
| Methylethylketone/cyclohexanone (6/4) | 200 parts | were added, and the mixture was dispersed for 120 minutes using a sand mill. To this:

| | |
|---|---|
| Butyl stearate | 2 parts |
| Stearic acid | 1 part |
| Methylethylketone | 50 parts | were added. After stirring and mixing for 20 minutes, this was filtered using a filter having average pore size of 1 μm, and a non-magnetic coating material was prepared.

The non-magnetic coating material was coated and the magnetic coating material was coated immediately thereafter in multiple layers using a reverse roll on the surface of the polyethylenenaphthalate support member of 10 μm in thickness so that the thickness after drying was to be 2.8 μm and 0.5 μm respectively. The non-magnetic support member with the magnetic coating material coated on it was processed by magnetic field orientation using a magnet of 3000 gauss while the magnetic coating material was not yet dried. Further, calender processing was performed after drying using a combination of metal roll—metal roll—metal roll—metal roll—metal roll—metal roll—metal roll at a rate of 100 m/min., linear pressure of 300 kg/cm, and temperature of 90° C., and the product was slit to pieces each 8 mm in width.

A magnetic coating material for the upper layer was prepared by the same procedure as in Example 9 except that the coating material of Comparative Example 1 was used.

The characteristics of the magnetic recording media of Examples and Comparative Examples thus prepared were determined by the measuring method 1 described below. The results are summarized in Table 2.

[Measuring Method 1]

1. Electromagnetic conversion characteristics: On a specimen tape, a signal of 7 MHz was recorded and reproduced using VTR (Sony Corporation; TR705). Relative reproducing output of the tape was measured with the reproducing output of 7 MHz recorded on a standard tape of Comparative Example 1 as 0 dB.
2. Ra: By light interference method using a digital optical profimeter (WYKO), central line average surface roughness at cut off value of 0.25 mm was measured as Ra.
3. Still durability: Under the conditions of 40° C. and 80% relative humidity, using the VTR used for the measurement of electromagnetic conversion characteristics and under still condition, the time until reproducing output reaches 50% of the recorded signal (still durability time) was measured.
4. Repeated running property: Using the same VTR as used in Example 1, a tape of 60-minute length was repeatedly run by 100 times under the conditions of 40° C. and 80% relative humidity and contamination of the video head was examined. Also, video output was continuously recorded, and decrease in output was measured with the first output as 0 dB.

Contamination of Video Head

| | |
|---|---|
| Very good | No contamination observed |
| Good | When wiped, contamination was observed |
| No good | Contamination was found by visual inspection |

5. Pot life of the coating solution

After the coating material was prepared, it was left to stand for 5 hours under the condition of 23° C. and 50% relative humidity, and this was coated. Compared with the coating of the coating material, which was not left to stand for 5 hours, if Rs was increased by 10% or more, it was regarded as "no good". If not, it was regarded as "good".

TABLE 2

| | Poly-urethane | Content of Formula 1 (wt %) | Content of Formula 2 (wt %) | Ether group content (mmol/g) | SQ | Ra (nm) | Electromag. transfer charac. (dB) | Output change (dB) | Contami-nation | Still durability (min.) | Pot Life |
|---|---|---|---|---|---|---|---|---|---|---|---|
| Example 1 | A | 20 | 10 | 1.0 | 0.94 | 2.7 | 0.7 | −0.3 | Very good | 60 or more | Good |
| Example 2 | B | ↓ | ↓ | 5.0 | 0.93 | 2.6 | 0.8 | −0.4 | Very good | 60 or more | Good |
| Example 3 | C | ↓ | 20 | 2.3 | 0.93 | 2.7 | 0.7 | −0.4 | Very good | 60 or more | Good |
| Example 4 | D | ↓ | ↓ | 5.0 | 0.93 | 2.8 | 0.6 | −0.4 | Very good | 60 or more | Good |
| Example 5 | E | 40 | 10 | 1.0 | 0.93 | 2.8 | 0.5 | −0.3 | Very good | 60 or more | Good |
| Example 6 | F | ↓ | ↓ | 1.9 | 0.93 | 2.8 | 0.5 | −0.4 | Very good | 60 or more | Good |
| Example 7 | G | ↓ | 20 | 2.3 | 0.92 | 2.7 | 0.5 | −0.5 | Very good | 60 or more | Good |
| Example 8 | H | ↓ | ↓ | 2.6 | 0.93 | 2.7 | 0.6 | −0.5 | Very good | 60 or more | Good |
| Example 9 | I | 20 | 10 | 5.0 | 0.93 | 2.6 | 0.5 | −0.4 | Very good | 60 or more | Good |
| Example 10 | J | ↓ | ↓ | ↓ | 0.92 | 2.8 | 0.6 | −0.6 | Very good | 60 or more | Good |
| Example 11 | K | ↓ | ↓ | ↓ | 0.93 | 2.8 | 0.5 | −0.5 | Very good | 60 or more | Good |
| Example 12 | S | ↓ | 10 | ↓ | 0.93 | 2.7 | 0.5 | −0.6 | Very good | 60 or more | Good |
| Example 13 | A | 20 | 10 | 1.0 | 0.94 | 2.4 | 1.2 | −0.6 | Very good | 60 or more | Good |
| Comparative Example 1 | L | 15 | 10 | 1.0 | 0.87 | 3.4 | 0 | −1 | No good | 30 | No good |
| Comparative Example 2 | M | ↓ | ↓ | 5.0 | 0.93 | 2.7 | 0.6 | −0.9 | No good | 35 | No good |
| Comparative Example 3 | N | 45 | ↓ | 1.1 | 0.88 | 3.6 | −0.3 | −1.2 | No good | 40 | No good |
| Comparative Example 4 | O | ↓ | ↓ | 1.9 | 0.90 | 3.0 | 0.3 | −1.0 | No good | 30 | No good |
| Comparative Example 5 | P | 20 | 5 | 1.0 | 0.90 | 2.9 | 0.2 | −0.9 | Good | 50 | No good |
| Comparative Example 6 | Q | ↓ | ↓ | 5.0 | 0.86 | 3.6 | −0.3 | −0.9 | Good | 50 | No good |
| Comparative Example 7 | R | ↓ | 10 | 5.2 | 0.85 | 3.6 | −0.5 | −0.9 | No good | 40 | No good |
| Comparative Example 8 | T | 15 | ↓ | 5.0 | 0.90 | 2.9 | 0.5 | −1.5 | No good | 30 | No good |

(Polyurethane Synthesis Example 2)

In a container equipped with reflux condenser and stirrer and with the content substituted in advance with nitrogen, the diols shown in Table 3 were dissolved in cyclohexanone under nitrogen stream at 60° C. Then, di-n-dibutyl-tin-dilaurate was added by 60 ppm to total quantity of the raw materials, and this was further dissolved for 15 minutes. Next, MDI and TNP as shown in Table 3 were added, and the mixture was heated at 90° C. for 4 hours, and the polyurethane resins 1 to 14 were prepared.

OH content and molecular weight of each of the polyurethane resins thus prepared are summarized in Table 3.

OH content of polyurethane was expressed by the number of OH groups per molecule calculated from number average molecular weight by polystyrene conversion, which was determined by OH value and GPC obtained by the test method of JIS K 0070.

TABLE 3

| Polyurethane | Short-chain diol having cyclic structure | | Long-chain diol containing ether | | DEIS | MDI | TMP | Ether content (mmol/g) | OH content (number/molecule) | Molecular weight (Mn) |
|---|---|---|---|---|---|---|---|---|---|---|
| 1 | HBpA | 17 | Compound A | 50 | 2 | 29 | 2 | 5.0 | 3 | 25000 |
| 2 | ↓ | 40 | ↓ | 20 | 2 | 36 | 2 | 2.0 | 3 | 23500 |
| 3 | ↓ | 20 | ↓ | 20 | 2 | 56 | 2 | 2.0 | 3 | 23000 |
| 4 | ↓ | 20 | Compound B | 40 | 2 | 36 | 2 | 5.0 | 3 | 28000 |
| 5 | ↓ | 30 | Compound A | 20 | 2 | 46 | 2 | 2.0 | 3 | 25300 |
| 6 | ↓ | 30 | ↓ | 30 | 2 | 36 | 2 | 3.0 | 3 | 26000 |
| 7 | ↓ | 20 | ↓ | 50 | 2 | 24 | 4 | 5.0 | 20 | 25500 |
| 8 | ↓ | 20 | ↓ | 50 | 2 | 22 | 6 | 5.0 | 25 | 24500 |
| 9 | ↓ | 20 | ↓ | 40 | 2 | 38 | 0 | 4.0 | 2 | 26500 |
| 10 | ↓ | 10 | ↓ | 50 | 2 | 36 | 2 | 5.0 | 3 | 26500 |
| 11 | ↓ | 50 | ↓ | 20 | 2 | 26 | 2 | 2.0 | 3 | 25000 |
| 12 | ↓ | 40 | Compound B | 15 | 2 | 41 | 2 | 2.0 | 3 | 24800 |
| 13 | ↓ | 20 | Compound C | 53 | 2 | 23 | 2 | 5.0 | 3 | 23400 |
| 14 | ↓ | 20 | Compound B | 50 | 2 | 26 | 2 | 6.4 | 3 | 25000 |
| 15 | Long-chain diol containing bisphenol A 69%; ether 8 mmol/g | | | | | | | | | |

The diols shown in the above table are as follows:
HBpA: Hydrogenated bisphenol A
   (Shin-Nippon Rika: Rikabinol HB)
Compound A: PO addition product of bisphenol A
   (molecular weight: 600) n=3 to 4
Compound B: PO addition product of bisphenol A
   (molecular weight: 1000) n=12 to 13
Compound C: PO addition product of bisphenol A
   (molecular weight: 500) n=2 to 3
DEIS: Ethyleneoxide addition product of sulfo-isophthalic acid
   (Taoka Chemical; DEIS)

MDI: 4.4-diphenylmethanedidiisocyanate
TMP: Trimethylolpropane

Compounds A to C

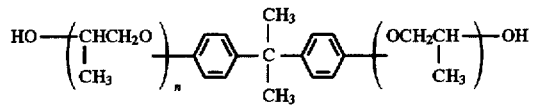

(Polyurethane Synthesis Example 3)

Using polyol obtained by addition reaction of ethyleneoxide to bisphenol A by the same procedure as the one described in Example 1 of JP-A-1-267829 and 4,4-diphenylmethanedidiisocyanate as polyisocyanate component, the polyurethane resin 15 was synthesized.

(EXAMPLE 14)

Using an open kneader, 100 parts of ferromagnetic alloy powder (composition: Fe 92%, Zn 4%, Ni 4%, Hc 20000e; crystallite size 15 nm, BET specific surface area 59 m$^2$/g; major axis diameter 0.12 µm; needle ratio 7; δ s 140 emu/g) were pulverized for 10 minutes. Then, 7.5 parts of a compound (SO$_3$Na=6×10$^{-5}$ eq/g; epoxy=10$^{-3}$ eq/g; Mw 30,000) obtained by adding hydroxyethylsulfonate sodium salt to a copolymer of vinyl chloride/vinyl acetate/ glycidylmethacrylate (86/9/5), 10 parts of polyurethane 1 (solids), and 60 parts of cyclohexanone were mixed and kneaded for 60 minutes. Then,

| Abrasive (Al$_2$O$_3$; particle size 0.3 µm) | 2 parts |
| Carbon black (particle size 40 nm) | 2 parts |
| Methylethylketone/toluene (1/1) | 200 parts | were added, and the mixture was dispersed for 120 minutes using a sand mill. To this, the following compounds were added:

| Polyisocyanate (Nippon Urethane; Coronate 3041) | 5 parts (solids) |
| Butyl stearate | 2 parts |
| Stearic acid | 1 part |
| Methylethylketone | 50 parts |

Further, this was stirred and mixed for 20 minutes and was filtered through a filter having average pore size of 1 µm, and a coating solution of the magnetic layer was prepared. Next, sulfonic acid containing polyester resin was coated as an adhesive layer on the surface of a polyethylene-naphthalate support member of 10 µm in thickness using a coil bar so that the thickness after drying was to be 0.1 µm, and the coating solution for the magnetic layer was coated using a reverse roll so that the thickness after drying was to be 2.5 µm.

The non-magnetic support member with the magnetic coating material coated on it was processed by magnetic field orientation using a magnet of 3000 gauss while the magnetic coating material was not yet dried. Further, calender processing was performed after drying using a combination of metal roll—metal roll—metal roll—metal roll—metal roll—metal roll—metal roll at a rate of 100 m/min., linear pressure of 300 kg/cm, and temperature of 90° C., and the product was slit to pieces each 8 mm in width.

(EXAMPLES 15 TO 22)

The magnetic recording media of Examples 15 to 22 were prepared by the same procedure as in Example 14 except that the polyurethane resin 1 was changed to the polyurethane resins shown in Table 3.

(EXAMPLE 23)

Coating solution for the lower non-magnetic layer having the following composition was prepared.

Using an open kneader, 85 parts of titatium oxide (average particle size 0.035 µm; crystal type rutile; TiO$_2$ content 90% or more; surface-treated layer: alumina; S$_{BET}$ 35 to 42 m$^2$/g, true specific gravity 4.1; pH 6.5 to 8.0) were pulverized for 10 minutes. Then, 11 parts of a compound (SO$_3$Na=6×10$^{-5}$ seq/g; epoxy=10$^{-3}$ eq/g; Mw 30,000) obtained by adding hydroxyethylsulfonate sodium salt to a copolymer of vinyl chloride/vinyl acetate/glycidyl-methacrylate (86/9/5), 10 parts of sulfonic acid containing polyurethane resin (solids) (Toyobo; UR8200), and 60 parts of cyclohexanone were mixed and kneaded for 60 minutes. Then,

| Methylethylketone/cyclohexanone (6/4) | 200 parts | were added, and the mixture was dispersed for 120 minutes using a sand mill. To this:

| Butyl stearate | 2 parts |
| Stearic acid | 1 part |
| Methylethylketone | 50 parts | were added. After stirring and mixing for 20 minutes, this was filtered using a filter having average pore size of 1 µm, and a coating solution for non-magnetic layer was prepared.

Next, as an adhesive layer, polyester resin containing sulfonic acid was coated on the surface of a polyethylene-naphthalate of 10 µm in thickness using a coil bar so that the thickness after drying was to be 0.1 µm. Then, the coating solution for non-magnetic layer and the coating solution for magnetic layer obtained in Example 14 were coated simultaneously in multiple layers using a reverse roll so that the thickness after drying of the non-magnetic layer and the magnetic layer was to be 2.0 µm and 0.1 µm respectively.

Next, while the coating solution for the magnetic layer was not yet dried, magnetic field orientation was performed using a magnet of 3000 gauss. After drying, calender processing with a combination of metal roll—metal roll—metal roll—metal roll—metal roll—metal roll—metal roll was performed at a rate of 100 m/min, linear pressure of 300 kg/cm and temperature of 90° C., and the product was cut into pieces each 8 mm in width.

(Comparative Examples 9 to 13)

Magnetic recording media of Comparative Examples 9 to 13 were prepared by the same procedure as in Example 14, except that the polyurethane resin 1 was changed to the polyurethane resins shown in Table 3.

(EXAMPLE 24)

A magnetic recording medium was prepared by the same procedure as in Example 23 except that the coating solution for the upper magnetic layer of Example 1 was used and polyurethane containing sulfonic acid UR8200 of Example 23 was changed to the polyurethane resin 1 of the coating solution for the lower non-magnetic layer.

(Comparative Example 14)

A magnetic recording medium was prepared by the same procedure as in Example 23 except that the coating solution of Comparative Example 9 was used as the coating solution for the upper magnetic layer.

(Comparative Example 15)

A magnetic recording medium was prepared by the same procedure as in Example 23 except that the coating solution of Comparative Example 9 was used as the coating solution for the upper magnetic layer and polyurethane containing sulfonic acid UR8200 was used as the polyurethane resin 11 of the coating solution for the lower non-magnetic layer.

5. Repeated running property: This was measured by the same procedure as in the measuring method 1 for the repeated running property.
6. Drop-out increase The tape was wound on a reel and this was left to stand for one week under the conditions of 60° C. and 90% relative humidity. Using VTR used in 1. above, 5-minute run was repeated by 100 times under the conditions of 40° C. and 10%. relative humidity, and the number of drop-outs, i.e. decrease of output by more than −10 dB for 15 μ sec per minute, was determined, and the results were given in the column of the drop-out increase.

TABLE 4

| | Poly-urethane | Short-chain diol with cyclic structure (wt %) | Long-chain diol containing ether (wt %) | Ether content (mmol/g) | OH content (number/molecule) | SQ | Ra (nm) | Electromag. transfer charac. (dB) | Output change (dB) | Contamination | Still durability (min) | Drop-out increase (number) |
|---|---|---|---|---|---|---|---|---|---|---|---|---|
| Example 14 | 1 | 17 | 50 | 5.0 | 3 | 0.94 | 2.6 | 0.7 | −0.2 | Very good | 60 min. or more | 5 |
| Example 15 | 2 | 40 | 20 | 2.0 | 3 | 0.95 | 2.6 | 0.7 | 0.0 | Very good | 60 min. or more | 5 |
| Example 16 | 3 | 20 | 20 | 2.0 | 3 | 0.93 | 2.7 | 0.6 | −0.3 | Very good | 60 min. or more | 5 |
| Example 17 | 4 | 20 | 40 | 5.1 | 3 | 0.93 | 2.5 | 0.8 | −0.3 | Very good | 60 min. or more | 6 |
| Example 18 | 5 | 30 | 20 | 2.0 | 3 | 0.93 | 2.5 | 0.7 | −0.3 | Very good | 60 min. or more | 7 |
| Example 19 | 6 | 30 | 30 | 3.0 | 3 | 0.93 | 2.7 | 0.6 | −0.2 | Very good | 60 min. or more | 5 |
| Example 20 | 7 | 20 | 50 | 5.0 | 20 | 0.94 | 2.6 | 0.7 | −0.2 | Very good | 60 min. or more | 7 |
| Example 21 | 8 | 20 | 50 | 5.0 | 25 | 0.92 | 2.8 | 0.5 | −0.5 | Very good | 60 min. or more | 8 |
| Example 22 | 9 | 20 | 40 | 4.0 | 2 | 0.93 | 2.8 | 0.6 | −0.2 | Very good | 60 min. or more | 5 |
| Example 23 | 1 | 17 | 50 | 5.0 | 3 | 0.93 | 2.4 | 0.9 | −0.3 | Very good | 60 min. or more | 6 |
| Example 24 | 1 | 17 | 50 | 5.0 | 3 | 0.94 | 2.4 | 0.9 | −0.3 | Very good | 60 min. or more | 5 |
| Comparative Example 9 | 10 | 10 | 50 | 5.0 | 3 | 0.93 | 2.6 | 0.7 | −1.0 | No good | 50 | 24 |
| Comparative Example 10 | 11 | 50 | 20 | 2.0 | 3 | 0.89 | 3.6 | 0.0 | −1.1 | No good | 55 | 18 |
| Comparative Example 11 | 13 | 20 | 53 | 5.0 | 3 | 0.90 | 3.4 | 0.3 | −0.9 | No good | 55 | 22 |
| Comparative Example 12 | 14 | 20 | 50 | 6.4 | 3 | 0.89 | 3.5 | 0.0 | −0.8 | No good | 43 | 32 |
| Comparative Example 13 | 15 | 0 | 69 | 8.0 | 3 | 0.89 | 3.5 | 0.0 | −0.8 | No good | 43 | 23 |
| Comparative Example 14 | 10 | 10 | 50 | 5.0 | 3 | 0.92 | 2.6 | 0.5 | −0.7 | No good | 45 | 19 |
| Comparative Example 15 | 10 | 10 | 50 | 5.0 | 3 | 0.93 | 2.7 | 0.6 | −0.7 | No good | 43 | 26 |

The characteristics of the magnetic recording media as prepared in Examples 14 to 24 and Comparative Examples 9 to 15 were determined by the procedure described in the measuring method 2. The results are summarized in Table 4.

[Measuring method 2]

1. Electromagnetic conversion characteristics: On a specimen tape, a signal of 7 MHz was recorded and reproduced using VTR (Sony Corporation; TR705). Relative reproducing output of the tape was measured with the reproducing output of 7 MHz recorded on a standard tape of Comparative Example 10 as 0 dB.
2. SQ: Using a vibratory specimen type flux meter (Toei Industry), measurement was made at Hm=5 kOe, and the value of SQ was obtained by:

$$SQ = Br/Bm$$

3. Ra: Measurement was made by the same procedure as that of Ra in the measuring method 1.
4. Still durability: This was measured by the same procedure as in the measuring method 1 for still durability.

By the binder for the magnetic recording medium containing the polyurethane according to the present invention, dispersion property of the ferromagnetic power is improved and electromagnetic conversion characteristics are also improved. The strength of coating film is high, and still durability and head contamination under high temperature conditions are improved. Further, the better preservation property under high temperature conditions is obtained, and drop-out decreases.

What we claim are:

1. A magnetic recording medium comprising a magnetic layer formed on a non-magnetic support member, said magnetic layer comprising ferromagnetic powder and a binder comprising a polyurethane resin which is a reaction product of diol and organic diisocyanate, wherein said diol comprises short chain diol and long chain diol, said short-chain diol has a cyclic structure and said short chain diol forms 17 to 40 weight % of said polyurethane resin, said long-chain diol contains 1.0 to 5.0 mmol/g of an ether group and said long-chain diol forms 10 to 50 weight % of said polyurethane resin, and the thickness of said magnetic layer is 1 μm or less, wherein said short-chain diol has a molecular weight less than 500, and said long-chain diol has a molecular weight of 500 to 5,000.

2. A magnetic recording medium according to claim 1, wherein said polyurethane resin contains 3 to 20 OH groups per molecule.

3. A magnetic recording medium according to claim 2, wherein said polyurethane resin contains at least one polar group selected from the group consisting of —$SO_3M$, —$OSO_3M$, —COOM, —$P_3M'_2$, —$OP_3M'_2$, —$NR_2$, —$N+R_2R'COO$—, wherein M represents a hydrogen atom, an alkali metal, an alkali earth metal or an ammonium salt, M' represents a hydrogen atom, an alkali metal, an alkali earth metal or an ammonium salt, and R and R' each represents an alkyl group having 1 to 12 carbon atoms.

* * * * *

UNITED STATES PATENT AND TRADEMARK OFFICE
CERTIFICATE OF CORRECTION

PATENT NO. : 5,702,821
DATED : December 30, 1997
INVENTOR(S) : MURAYAMA et al.

It is certified that error appears in the above-identified patent and that said Letters Patent is hereby corrected as shown below:

In claim 3, column 21, make the following two changes:

- in line 4, change "$-P_3M'_2$" to -- $-PO_3M'_2$ --,

- in line 4, change "$-OP_3M'_2$" to -- $-OPO_3M'_2$ --.

Signed and Sealed this

Fifth Day of May, 1998

*Attest:*

*Attesting Officer*

BRUCE LEHMAN

Commissioner of Patents and Trademarks